United States Patent [19]

Keller

[11] 3,931,712

[45] Jan. 13, 1976

[54] INTERNAL COMBUSTION ENGINE TURBOCHARGER PRESSURE CONTROL REGULATORS

[75] Inventor: Robert A. Keller, Huntington Beach, Calif.

[73] Assignee: The Echlin Manufacturing Company, Branford, Conn.

[22] Filed: Oct. 15, 1974

[21] Appl. No.: 514,412

[52] U.S. Cl. .................. 60/602; 60/600; 137/94
[51] Int. Cl.² .......................................... F02D 23/00
[58] Field of Search ............ 60/598, 600, 602, 605, 60/39.29; 123/119 C; 137/87, 94; 415/29

[56] References Cited
UNITED STATES PATENTS

| | | | |
|---|---|---|---|
| 3,035,408 | 5/1962 | Silver | 60/602 |
| 3,096,614 | 7/1963 | Silver et al. | 60/602 |
| 3,104,520 | 9/1963 | Cazier et al. | 60/602 |
| 3,195,805 | 7/1965 | Cholvin et al. | 60/602 |
| 3,233,403 | 2/1966 | MacInnes et al. | 60/600 |
| 3,611,711 | 10/1971 | Mueller | 60/600 |

*Primary Examiner*—Wendell E. Burns
*Assistant Examiner*—David D. Reynolds
*Attorney, Agent, or Firm*—Lilling & Siegel

[57] ABSTRACT

This invention provides a differential pressure-activated control system having non-mechanical, remotely controllable, biasing means. The system comprises a differential pressure sensing means, having opposing first and second pressure sensing portions, a conduit between one portion of the sensing means and a system to be monitored and a second conduit means between a second portion of the pressure sensing means and the system to be monitored; the second conduit comprising in intermediate fluid flow pressure connection, a pressure regulator which limits the maximum pressure, in accordance with a desired predetermined pressure, conducted to the second portion of the pressure sensing means. Such pressure regulator can be remote from the system and from the pressure sensing means and is connected thereto only by non-moving, pressure-connecting means.

15 Claims, 1 Drawing Figure

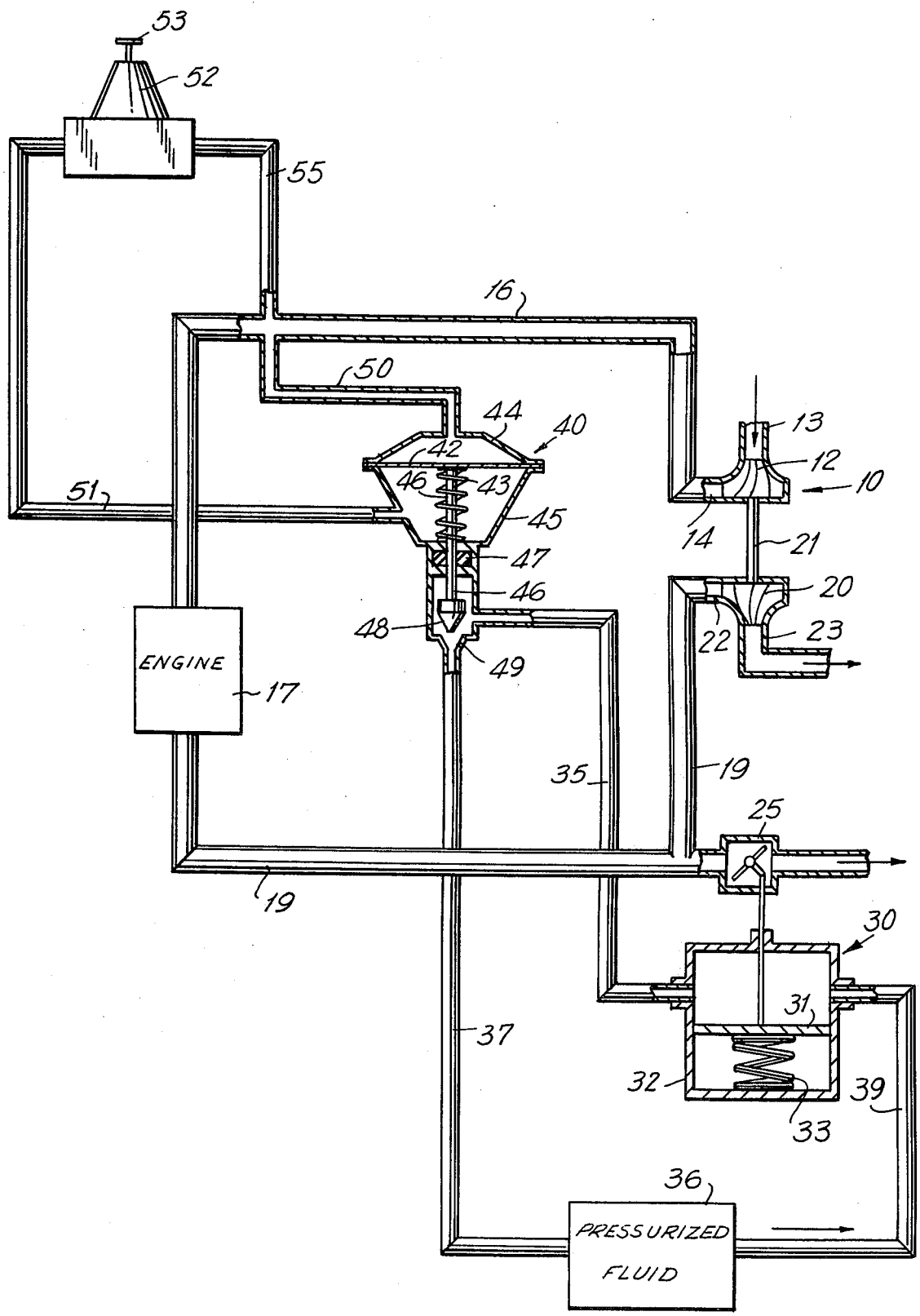

INTERNAL COMBUSTION ENGINE TURBOCHARGER PRESSURE CONTROL REGULATORS

The present invention is directed to a control unit responsive to the pressure of a fluid effluent from a pressurized unit which it is desired to control, and in particular a control unit for controlling a turbocharger super-charging device for an internal combustion engine.

A problem which arises in the fluid process art generally, and most particularly in systems, such as a turbocharger system, for supplying air and/or fuel and air at a desired pressure to the internal combustion engine, is that the output of the turbocharger must be controlled in response to the required manifold pressure. In the case of aircraft, this requires adjustment for the altitute of the aircraft and the density of the gas which must be provided by the turbocharger to the engine in relation to the density of gases at the operating altitude. With regard to surface vehicles, including both land-vehicles and marine-vehicles, i.e. boats or amphibious vehicles, it is desired to pressurize the fuel-air mixture in order to increase efficiency.

The so-called turbocharger is perhaps the most common method of pressurizing the fuel-air charge to an engine and comprises a centrifugal type compressor which is generally wholly or partially driven by, for example, a turbine powered by the engine exhaust gases; thus, the energy in the exhaust gases is utilized, and not lost through the exhaust system. Generally, such turbocharger system is in effect self-regulating in that an increased speed of operation of the engine generates a corresponding increase in exhaust gas pressure, which in turn generates increased power for operating the compressor, which in turn provides a greater mass for the fuel-air mixture supplied to the engine-cylinders and thus renders more efficient the operation of the engine. Centrifugal type compressors are shown, for example, in U.S. Pat. Nos. 3,380,245 to Mick, and 2,903,874 to Boyd.

In order to further regulate the speed of the compressor, and in order to avoid operating at too high a turbine speed and thus at too high a pressure, provisions are made for diverting all or a portion of the exhaust gas, as desired, and thus slow down the speed of operation turbine-compressor. Such a device is commonly called a wastegate by-pass valve.

A common system for controlling the wastegate valve is the use of a pressure sensitive device which directly, or indirectly, through, for example, a hydraulic system, opens and closes the wastegate by-pass valve in response to changes in the output pressure from the turbocompressor. One such system, for example, is disclosed by Mueller in U.S. Pat. No. 3,611,711. Mueller describes a turbocharger, wherein the wastegate by-pass valve is indirectly operated by a hydraulic system controlled by a differential pressure device which is connected to two points in the fluid line leading from the turbine output to the internal combustion engine. The two points, in effect, measure the pressure drop along a certain portion of the line which includes a butterfly valve. The pressures from the two points in the system are applied to opposite sides of a movable, biased diaphragm which is in turn connected to a valve which activates a hydraulic system for opening and closing the wastegate valve. Thus, when the pressure drop reaches a defined value, which is determined by the absolute pressure at the output of the turbocharger, the hydraulic line is activated to open the wastegate valve, thereby limiting the pressure at that value. A similar device is disclosed by Silver in U.S. Pat. No. 3,035,408; however, Silver measures the pressure drop across the turbocompressor, i.e. the pressure at the inlet to the compressor and at the outlet from the compressor; the pressure means is activated in response to a certain ratio between the inlet and the outlet pressures.

A problem with the above and other previous systems for regulating such pressure is that the desired pressure limit is determined by mechanical means in the pressure-responsive element and thus the operator must be at a position accessible to the pressure-responsive means, or alternatively, extensive and often complex mechanical linkages must be arranged to enable the operator to obtain the desired control over the process system. Such devices are not only applicable to the turbocharger-internal combustion engine combination, but generally to substantially any process system, including industrial chemical processing system, wherein the pressure of the output gas is in some way, directly or indirectly, related to one or more parameters for the system's operation; thus, the pressure-responsive control means can be utilized not only to vary the amounts of, for example, exhaust gas fed to the compressor drive turbine, but also, for example, the amounts of reagent fed to a chemical reactor, or the temperature at which the reaction in a chemical reactor is carried out. Alternatively, the pressure-responsive means can be utilized merely to generate a signal to an operator indicating a certain pressure has been reached.

The present invention, therefore, provides pressure-activated, signal-generating means, having biasing means for permitting varying the pressure at which the system will react; the biasing means being readily remotely controllable utilizing a simple fluid pressure connection without requiring extensive mechanical linkage, regardless of the distance between the operating device and the control valve. Further, the present invention utilizes a pressure tap at a single point in the system being monitored, but provides a signal based upon a set differential pressure. A preferred embodiment of this invention permits the control of the speed of a turbocharger operated by the exhaust gas from the internal combustion engine being supercharged, wherein the supercharging pressure desired can be varied by remotely controlled pressure bias means.

In accordance with the present invention, there is provided a differential pressure-activated control system having remotely controllable biasing means, the system comprising: two pressure-sensing surfaces, both being in fluid pressure connection with the substantially same point in a system to be monitored; conventional pressure regulating means connected intermediate to the reference sensing surface and the system to be monitored in order to limit the pressure which can be transmitted to the reference surface; and signal generating means designed and adapted to generate a signal when there is a predetermined difference between the pressures against the two sensing surfaces. The predetermined difference is reached after the pressure regulator connected to the second surface reaches its pressure limit, thereby preventing any further increase in the pressure against the reference surface, while the pressure to the first surface continues to increase. When the differential between the two pressures is at a predetermined level, which differential can be a substantial constant for the system, a signal is generated which in turn can be utilized directly to automatically activate the desired operating means or to merely provide a signal for a manual operation. This invention further provides a system for controlling the speed of a turbocharger for an internal combustion engine, wherein the turbocharger is driven by the exhaust gases from the engine and wherein the control system generates a signal for controlling the admission of the exhaust gases to the turbocharger.

Other features, objects and advantages of the present invention will be readily apparent from the following description of preferred embodiments thereof. Variations of the preferred embodiments, including that shown in the accompanying drawings, can be effected, without departing from the spirit and scope of the invention disclosed herein.

The accompanying drawing is a schematic diagram, in partial section, of a system encompassing the pressure control system of the present invention, including a turbocharger and an interior combustion engine. The various components of the system are shown diagrammatically, in many cases only symbolically; however, these elements are each conventional in the art and the exact construction or design thereof are not basic to the present invention. A more extended description thereof would only tend ot obfuscate the invention defined herein.

Referring to the drawings, a turbocharger, generally designated by the numeral 10, comprises a rotor 12, an intate 13 and an outlet 14, which supplies air to an engine intake manifold 16 of an internal combustion engine 17. The turbocharger rotor 12 is directly connected to a gas turbine, vaned rotor 20, via shaft 21. The gas turbine vaned rotor 20 has an inlet 22 and an outlet 23. The gas turbine inlet 22 is in turn connected to the exhaust manifold 19 of the internal combustion engine 17.

The amount of exhaust gas passing to the gas turbine inlet 22 from manifold 19 can be controlled via a wastegate bypass valve 25, in this case shown as a butterfly valve which can be opened to bypass a portion of the exhaust in manifold 19. The butterfly valve 25 is directly operated by a hydraulic actuator, generally indicated by the numeral 30, and comprising a piston 31 reciprocating within a closed cylinder 32 and biased to maintain the butterfly valve 25 in the closed position by spring 33.

The hydraulic actuator 30 is connected via hydraulic fluid conduit 39 to a source of high pressure hydraulic fluid 36. The hydraulic fluid from the actuator 30 drains through conduits 35 and 37 back to the fluid supply 36 via is pressure-activated control means, generally, indicated by a numeral 40. The pressure-activated control means 40 is shown herein in highly schematic form, however these devices are generally available to the art and substantially any device which can be activated by balancing pressures against two different surfaces to actuate a signal, can be utilized.

In the highly schematic accompanying drawing, the controller is a diaphragm-type controller, wherein pressure is applied against the opposing surfaces of a movable diaphragm 41, which is in turn biased against movement in a downward direction by spring 43. When the pressure in the upper chamber, defined by the upper cover plate 44, is greater than the pressure in the lower, or reference, chamber, defined by lower cover plate 45, by an amount sufficient to overcome the force of the spring, the diaphragm 42 is moved in a downwardly direction. Diaphragm 42 is connected to a vertical shaft 46 which passes through a sealing ring 47; on the far end of the shaft 43, there is attached a valve head 48. When the shaft 46 is moving in a downwardly direction, valve head 48 seats against valve seat 49. The upper chamber 44 is directly connected via conduit 50 to the engine intake manifold 16. Lower chamber 45 of the pressure-activated controller 40 is connected via conduit 51 to a pressure regulating means 52, which can be in a remote location, and is in turn connected via conduit 55 to the intake manifold 16 at substantially the same point at which conduit 50 is connected thereto. The air regulator 52 includes a manually operable handle 53 which is connected to an internal mechanism, for example a spring, thereby permitting setting a predetermined value and varying said value as desired for operation of the regulator. When the pressure in conduit 16, as conducted via conduit 55, reaches a certain predetermined maximum value, the air regulator 52 is activated to close off that conduit, thereby limiting the pressure transmitted to the lower chamber 45 of the pressure controller 40.

In operation, butterfly valve 25 is normally held in the closed position by the action of helical spring 33 in the hydraulic actuator 30, i.e. butterfly valve 25 is in the vertical position, when closed, in the drawing as shown. Upon starting up the engine, exhaust gases leave the engine 17 through manifold 19 and pass into the rotary turbine 20 via inlet 22, thus, creating a rotary motion of the turbine 20, which rotary motion is conducted via shaft 21 to create an equivalent rotary motion of the compressor turbine 12. Air and fuel mixture entering the turbine compressor 12 via inlet 13 is compressed and passed out at an advanced pressure through outlet 14 and then to inlet manifold 16, where it is passed to the internal combustion engine 17. The pressure in the inlet manifold 16 is transmitted via conduit 50 to the upper chamber 44 of pressure controller 40 and via conduit 55 and 51, passing through regulator 53, to the lower chamber 45 of the controller 40. The diaphragm 42, of the controller 40, is held in the normally equilibrium position, i.e. level, as shown in the drawing, by the biasing action of spring 43.

As the engine speed increases, the flow of exhaust gases through exhaust manifold 19 increases, thus increasing the flow of the exhaust gas into the drive turbine inlet 22. This, in turn, causes an increase in the outlet pressure from the compressor tubrine 12, thus increasing the pressure in the inlet manifold 16. The pressure in upper and lower chambers 44 and 45 of the pressure controller are, up to this time maintained substantially constant because the conduits 55 and 50 tap the inlet manifold 16 at substantially the same location. When the maximum pressure set for the regulator 52 is reached, however, the regulator is activated to close off the conduit 55/51, thus in effect limiting the pressure within the reference chamber 45 at that level. As the pressure in the intake manifold 16 continues to increase with increasing engine speed, the pressure in upper chamber 44 gradually increases above that within reference chamber 45 until the pressure differential is equal to the biasing force exerted by spring 43. After this point, the diaphragm 42 is forced in a downwardly direction, thereby causing valve head 48 to move downwardly and into contact with valve seat 49.

This closes off the circulating flow from high pressure oil source 36 through the hydraulic actuator 30. This in turn causes an increase in the pressure within actuator 30, above piston 31; when the pressure above piston 31 increases to a value sufficiently great to overcome the biasing action of spring 33, the piston 31 is moved in a downwardly direction, thereby causing butterfly valve 25 to open, permitting the exhaust gases to be partially diverted from exhaust manifold 19 outwardly through the wastegate valve 25. This in turn reduces the flow of the exhaust gas to the driving turbine 20 and in turn serves to reduce the pressure in inlet 16 until an equilibrium value is reached.

It is understood that this system will tend to oscillate in a usual manner between the open and closed positions as the system strives to reach an equilibrium point at which the inlet manifold pressure 16 is substantially at that set by the pressure regulator 52. However, such oscillations can be dampened by conventional means well-known to the art and such means are not set forth explicitly herein in order to avoid confusing the reader and ofuscating the scope of the invention defined herein.

The pressure controller which is described and shown in the accompanying drawing and above description is of a type wherein a pressure differential across a movable member, in the case shown a diaphragm, causes the movement of the member, against a biasing action, to generate a signal; in this case the signal is a closing of a hydraulic valve, which in turn automatically actuates a wastegate valve to open the exhaust manifold from an internal combustion engine. The control valve 40 is a conventional sliding stem, single-seated, diaphragm motor valve of the direct acting type. In the conventional such pneumatic, diaphragm motor-powered control valve, the upper chamber is connected to the pressure source for operating the diaphragm and the lower chamber is often vented to the atmosphere. See, for example, the bypass control valve in the turbocharger disclosed in U.S. Pat. No. 3,380,245 to Mick. Alternatively, where a differential pressure is to be measured between two process points, as in the turbocharger control system to Mueller, U.S. Pat. No. 3,611,711, the two sides of a diaphragm are connected to the two different points of the process system; when the differential pressure between the two points reaches a certain value, the spring force is overcome and the diaphragm is forced to move in the required direction. In the present device, the pressure to both sides of the diaphragm is obtained from the process system, i.e. in this case a turbocharger-engine system, at the same point in the system, such that the pressure is the same. Thus during normal operation of the system, the pressure across the diaphragm is substantially equal. However, the pressure conduit to the reference chamber, i.e., the bottom chamber 45 of the control valve, is connected to the system via a pressure regulator, which has a function of limiting the pressure which can be passed through such conduit. Thus, when the limiting pressure is reached in the reference chamber, additional increase in pressure is prevented and eventually a pressure differential develops across the diaphragm sufficient to overcome the bias of the spring. Thus the effect of the present invention is not to operate a control valve utilizing a pressure drop through a system, but rather to utilize the pressure at a single point and to obtain a pressure differential at a variable absolute pressure point, so as to permit control over the pressure at which the control valve will be actuated without requiring any manipulation of the mechanical components of the valve itself. There is no requirement for any mechanical linkage between the regulator and the control valve; only a simple pressure conduit is necessary.

The pressure regulator itself can be of a conventional type also and includes, for example, the self-operating pressure regulator conventionally used in process control systems. Such pressure regulators, or reducing valves, are shown, for example, in *Chemical Engineers Handbook*, Third Edition, John H. Perry (Ed.), page 1320.

In addition to the biased, moving member type of pressure controller and pressure regulator described above, other, perhaps less conventional, types of controllers can be utilized, where their peculiar characteristics are required and their additional cost not a problem. For example, the pressure regulator 40 can be replaced by a fluidic pressure controller, where the signal is obtained from opposing jets of fluid and not from a movable diaphragm as shown in the accompanying drawing. The signal obtained from such fluidic pressure controllers can then be utilized in the same manner as described above for the activation, for example, of a hydraulic fluid supply valve. Further the two opposing jets are connected as in the present case to the same point in the process control system; one jet being connected via a regulator, for example of the same or different type of that shown above, the second directly connected to the system; thus the same manner of varying the point at which a differential pressure develops can be obtained without requirements of any extensive mechanical linkages between the operating process and the operator's position.

A second type of pressure controller is a wholly electronic type utilizing, for example, strain gauges of a type commonly used in the industry. Strain gauges react by a change in impedence, or resistance, upon being subjected to varying amounts of stress. Accordingly, in this type of system, conduit 50 can expose the pressure of inlet manifold 16 to one strain gauge, the conduit 51 can expose the pressure of conduit 16, via regulator 52, to a second strain gage; the potential drops of the two strain gauges can then be balanced and the electrical impulse resulting therefrom utilized to activate a solenoid, also in a conventional manner. Generally, the power obtained from such strain gages is of a minuscule quantity and thus conventional amplification means, whether of the bridge type, or of the solid state variety, can be utilized. Any other means of measuring pressure differential, whether now known or to be developed, can be utilized, and considered as the equivalent of the pressure controller described and shown herein.

Accordingly, the present invention provides a simple, nonmechanical means for remotely controlling the pressure at which a pressure controller will activate a desired signal. The pressure controller operates on a differential pressure basis and the present invention varies the absolute pressure value at which the desired pressure differential initially develops. Thus, in operation, the desired maximum pressure in inlet manifold 16 is to be set to equal to the pressure value set on regulator 52, plus the pressure exerted by the biasing member, e.g., in the exemplified case above, exerted by spring 43. In other words, the pressure at which regular 52 is to be set to close off the flow through conduit 55 and 51, is the desired maximum value in inlet manifold 16, less the biasing pressure of spring 43.

The preferred embodiment of the pressure controller shown in the accompanying drawing includes a separate mechanical biasing means, i.e. helical spring 43, which must be overcome before the pressure drop across the two pressure sensing surfaces on diaphragm 42 can activate the signal generating means. Alternative embodiments utilizing other types of mechanical biasing means, such as gravity, e.g. the weight of the diaphragm 42, and the valve head 48, where the diaphragm moves upwardly to generate a signal. It is also possible to utilize a pressure controller which has no biasing means, whereby the slightest pressure differential generates a signal.

The patentable embodiments of the invention which are claimed are as follows:

1. A differential pressure-activated control system having remotely controllable biasing means, the system comprising:
   a. first pressure-sensing surface;
   b. reference pressure-sensing surface;
   c. signal generating means, operatively connected to the first pressure-sensing surface and to the reference pressure-sensing surface, the signal generating means being designed and adapted to generate an activating signal when there is a predetermined differential between the pressures applied against the first and reference pressure-sensing surfaces;
   d. first pressure conducting means in fluid pressure connection with the first pressure sensing surface and designed and adapted to connect the first pressure sensing surface to a source of pressure;
   e. reference pressure conducting means in fluid pressure connection with the reference pressure sensing surface;
   f. an externally controllable regulating means in fluid pressure connection with the reference pressure conducting means, and designed and adapted to connect the reference pressure conducting means to the source of pressure, and being further designed and adapted to limit the pressure reaching the reference pressure conducting means from the source of pressure to a desired maximum value; whereby the absolute pressure, at which the signal generating means generate an activating signal, is controlled by the regulating means.

2. The control system of claim 1, wherein the pressure sensing surfaces comprise opposing surfaces of a movable member.

3. The control system of claim 2, wherein the movable member is biased against movement.

4. The control system of claim 3, wherein the source of pressure is the inlet manifold connecting the output of a turbocharger and an internal combustion engine.

5. A differential pressure-control system, having remotely controllable biasing means, the control system being designed and adapted for controlling the output pressure for a supercharger by varying the amounts of the power source supplied to the supercharger, the control system comprising:
   differential pressure-responsive means, comprising a displaceable member having opposing pressure surfaces, a first surface and a reference pressure surface, the member being displaceable when the pressure applied to the opposing surfaces differs by a predetermined differential value;
   control means for regulating the amount of power source supplied to the supercharger;
   linkage means, operatively connecting the displaceable member and the control means;
   first pressure conducting means designed and adapted to place in fluid pressure connection, the first surface and the outlet from a supercharger, so as to apply against the first surface the pressure at the supercharger outlet;
   reference pressure conducting means in fluid pressure connection with the reference pressure surface; and
   an externally controllable pressure regulating means in fluid pressure connection with the reference pressure conducting means and designed and adapted to be in fluid pressure connection with the outlet from the supercharger, the regulating means being further designed and adapted to limit the maximum value of the pressure transmitted from the supercharger outlet via the regulator and the reference pressure conducting means to the reference pressure surface, whereby there is substantially no differential pressure between the opposing surfaces of the displaceable member until the aforesaid maximum reference pressure is reached, at which point a pressure differential develops, the control means receives a signal from the pressure-responsive means when the pressure differential exceeds the predetermined value;
   thus, the absolute pressure at which the control means is activated is controlled by the pressure regulating means.

6. The pressure control system of claim 5, wherein the displaceable member is a diaphragm.

7. The pressure control system of claim 6, wherein the control means comprises a valve having a valve head and a valve seat, the valve head being operatively connected to the linkage means so as to be moved relative to the valve seat upon movement of the displaceable member, in response to the predetermined pressure differential.

8. The pressure control system of claim 6, wherein the differential pressure responsive means comprises a housing having a cavity; the displaceable member being disposed within the cavity and dividing the cavity into a first and a reference chamber; the first pressure conducting means being in fluid pressure connection with the first chamber and the reference pressure conducting means being in fluid pressure connection to the reference chamber; the chambers being sealably separated by the displaceable member.

9. In combination with an internal combustion engine, the engine comprsing a combustion chamber, inducting means for forming fuel/air mixtire, an induction conduit in fluid flow connection with the induction means and combustion chamber, and means to exhaust fluid from the combustion chamber:
   A. supercharging means having an inlet and an outlet, the outlet being in fluid flow connection with the induction conduit
   B. means for providing energy to drive the supercharger; and
   C. differential pressure-activated control system, having remotely controllable biasing means, the control system comprising:
      i. a differential pressure responsive means, comprising a displaceable member, having opposing surfaces, a first surface and a reference surface, the member being displaceable when the pressure applied against the opposing surfaces differ by a predetermined differential value;

ii. control means operatively connected to the supercharger power source for regulating the amounts of power supplied to the supercharger;

iii. linkage means operatively connecting displaceable member to the control means;

iv. first pressure conducting means in fluid pressure connection between the supercharger outlet and the first surface, so as to supply supercharger outlet pressure to act against the first surface;

v. reference pressure conducting means in fluid pressure connection with the reference surface; and vi. an externally controllable pressure regulating means in fluid pressure connection between the reference pressure conducting means and the supercharger outlet, the pressure regulator having means for sealing off the reference pressure conducting means from the turbocharger outlet, when a predetermined maximum pressure is reached;

whereby there is substantially no differential pressure across the displaceable member until said predetermined maximum pressure is reached, after which time, a pressure differential develops the displaceable member is displaced when said differential reaches the predetermined value, thereby activating the control means and decreasing the power supplied to the supercharger, thus limiting the output pressure therefrom.

10. The combination according to claim 9, wherein the energy means for the supercharger comprises a drive means designed and adapted to utilize energy provided by the internal combustion engine.

11. The combination of claim 10, wherein the drive means utilizes the energy in the exhaust fluid for driving the supercharger.

12. The combination of claim 11, wherein supercharging means is a centrifugal compressor.

13. The combination of claim 12, wherein the drive means comprises a gas turbine, directly driving the centrifugal compressor, the gas turbine being in fluid flow connection with the exhaust means from the combustion chamber, whereby the exhaust gases from the internal combustion engine drive the gas turbine.

14. The internal combustion engine of claim 13, wherein the control means comprises a wastegate bypass valve for permitting the diversion of exhaust gas away from the gas turbine; and hydraulic actuating means operatively connected to the wastegate bypass valve and operatively connected to the displaceable member, whereby displacement of the displaceable member results in activation of the hydraulic actuator and opening of the wastegate bypass valve.

15. The combination of claim 14, wherein the displaceable member comprises a diaphragm biased against movement in response to a differential pressure, by a spring biasing member; the linkage means comprises a valve head stem connected to the diaphragm and to the valve head, and the control means comprising, in addition, a valve seat designed and adapted to be sealably closed when contacted by the valve head, the valve seat being in fluid pressure connection intermediate the hydraulic actuating means and a source of high-pressure hydraulic fluid, the hydraulic source being in fluid pressure connection in turn with the hydraulic actuating means, whereby when the displaceable member is displaced, the valve head seats against the valve seat, thereby closing off the flow connection between the actuator and the high-pressure fluid supply and thereby in turn creating change in pressure in the hydraulic actuator, which in turn actuates and opens the wastegate bypass valve.

* * * * *